(12) United States Patent
Kohira et al.

(10) Patent No.: US 12,068,489 B2
(45) Date of Patent: Aug. 20, 2024

(54) BATTERY

(71) Applicant: Panasonic Intellectual Property Management Co., Ltd., Osaka (JP)

(72) Inventors: Kazutoshi Kohira, Hyogo (JP); Tatsuya Hirano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 550 days.

(21) Appl. No.: 17/414,766

(22) PCT Filed: Dec. 19, 2019

(86) PCT No.: PCT/JP2019/049752
§ 371 (c)(1),
(2) Date: Jun. 16, 2021

(87) PCT Pub. No.: WO2020/137776
PCT Pub. Date: Jul. 2, 2020

(65) Prior Publication Data
US 2022/0077527 A1    Mar. 10, 2022

(30) Foreign Application Priority Data
Dec. 28, 2018  (JP) ................................ 2018-248607

(51) Int. Cl.
*H01M 50/107*    (2021.01)
*H01M 50/147*    (2021.01)
(Continued)

(52) U.S. Cl.
CPC ....... *H01M 50/107* (2021.01); *H01M 50/147* (2021.01); *H01M 50/179* (2021.01); *H01M 50/184* (2021.01); *H01M 50/188* (2021.01)

(58) Field of Classification Search
CPC ............ H01M 50/107; H01M 50/179; H01M 50/184; H01M 50/188; H01M 10/0587; H01M 50/152
See application file for complete search history.

(56) References Cited

U.S. PATENT DOCUMENTS

2018/0183109 A1*  6/2018  Miura ............... H01M 10/0587
2018/0342724 A1*  11/2018  Okazaki ............. H01M 50/533

FOREIGN PATENT DOCUMENTS

JP          7-105933          4/1995

OTHER PUBLICATIONS

International Search Report of PCT application No. PCT/JP2019/049752 dated Mar. 10, 2020.

\* cited by examiner

*Primary Examiner* — Adam A Arciero
(74) *Attorney, Agent, or Firm* — WHDA, LLP

(57) ABSTRACT

A battery includes a battery can including a cylindrical portion and a bottom portion, the cylindrical portion including an opening edge portion at one end portion of the cylindrical portion, the bottom portion closing the other end portion of the cylindrical portion; an electrode body housed in the cylindrical portion; a sealing member sealing an opening of the opening edge portion; and a fixing member fixing the sealing member to the battery can. The sealing member includes a terminal portion, an outer ring, and a first gasket, the outer ring being disposed along a peripheral edge of the terminal portion, and the first gasket being interposed between the opening edge portion and an external peripheral edge portion of the outer ring. The fixing member compresses the first gasket in a direction in which the external peripheral edge portion and the opening edge portion face each other, the fixing member compressing the first gasket (Continued)

via the external peripheral edge portion and the opening edge portion.

14 Claims, 5 Drawing Sheets

(51) Int. Cl.
  *H01M 50/179* (2021.01)
  *H01M 50/184* (2021.01)
  *H01M 50/188* (2021.01)

(A)

(B)

(A)

(B)

(C)

(D)

BATTERY

CROSS-REFERENCE TO RELATED APPLICATIONS

This application is a U.S. national stage application of the PCT International Application No. PCT/JP2019/049752 filed on Dec. 19, 2019, which claims the benefit of foreign priority of Japanese patent application No. 2018-248607 filed on Dec. 28, 2018, the contents all of which are incorporated herein by reference.

TECHNICAL FIELD

The present invention relates to a battery.

BACKGROUND ART

As a method for sealing an opening of a battery can after an electrode body is housed in the battery can, as shown in PTL 1, a method is known in which an annular groove is formed by reducing a diameter of the battery case (battery can) near the opening, a gasket and a sealing plate are placed over an upper part of the groove, and a crimped portion is formed by crimping an end of the opening of the battery case to the sealing plate via the gasket.

CITATION LIST

Patent Literature

PTL 1: Unexamined Japanese Patent Publication No. 7-105933

SUMMARY OF THE INVENTION

However, in the battery having the groove and the crimped portion, since the crimped portion is formed by placing the sealing member on the groove and the gasket on the sealing member, the dimension in the height of the battery near the sealing plate tends to increase. Therefore, there is a limit on an increase of the energy density as a battery.

One aspect of the present invention relates to a battery including: a battery can having a cylindrical portion and a bottom portion, the cylindrical portion having an opening edge portion at one end portion of the cylindrical portion, the bottom portion closing the other end portion of the cylindrical portion; an electrode body housed in the cylindrical portion; a sealing member sealing an opening of the opening edge portion; and a fixing member fixing the sealing member to the battery can, wherein the sealing member includes a terminal portion, an outer ring, and a first gasket, the outer ring being disposed along a peripheral edge of the terminal portion in a state of insulation from the terminal portion, and the first gasket being interposed between the opening edge portion and an external peripheral edge portion of the outer ring, the electrode body includes a first electrode and a second electrode, the terminal portion is electrically connected to the first electrode, the battery can is electrically connected to the second electrode, and the fixing member compresses the first gasket in a direction in which the external peripheral edge portion and the opening edge portion face each other, the fixing member compressing the first gasket via the external peripheral edge portion and the opening edge portion.

According to the present invention, a battery having a high energy density may be easily realized.

DESCRIPTION OF EMBODIMENT

Figure 1:
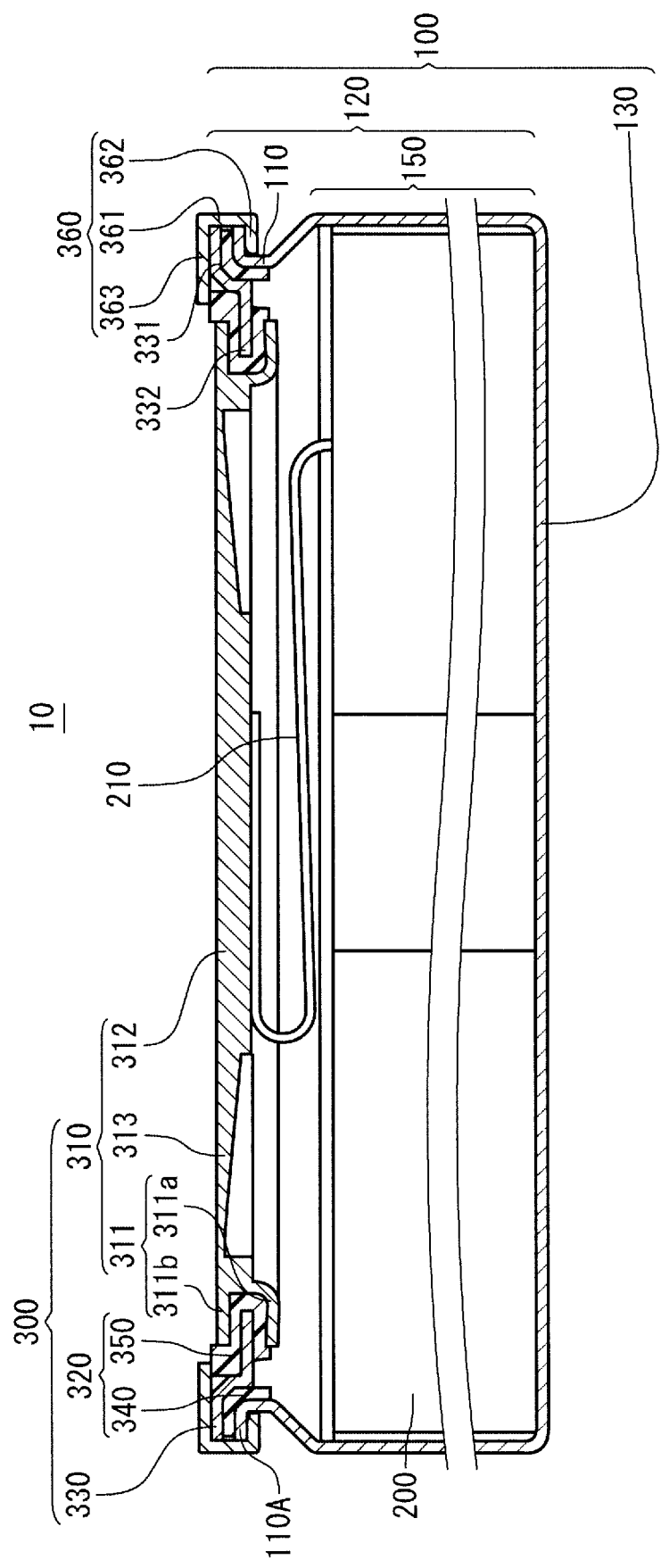
FIG. 1 is a schematic longitudinal sectional view of a battery according to a first exemplary embodiment of the present invention.

A battery according to the present exemplary embodiment includes a battery can having a cylindrical portion and a bottom portion. The cylindrical portion has an opening edge portion at one end portion of the cylindrical portion, and the bottom portion closes the other end portion of the cylindrical portion. The battery also includes an electrode body housed in the cylindrical portion, a sealing member sealing an opening of the opening edge portion, and a fixing member fixing the sealing member to the battery can.

Here, a direction in which both end portions of the cylindrical portion face each other is defined as an axial direction. For convenience, a direction toward the bottom portion from the opening edge portion is defined as a downward direction, and a direction toward the opening edge portion from the bottom portion is defined as an upward direction. That is, the upward and downward directions of the battery are defined based on the axial direction of the cylindrical portion when the battery can is upright with the bottom portion facing downward. The direction perpendicular to the axial direction may be referred to as a lateral direction or a radial direction.

It is not necessary for the battery of the present exemplary embodiment to include a conventional annular groove (also referred to as a reduced diameter portion). Therefore, the electrode body may be disposed closer to a terminal portion, or the height of the electrode body may be increased to a position close to the terminal portion. Thus, the energy density of the battery may be increased.

The sealing member includes the terminal portion, an outer ring, and a first gasket. The terminal portion may be electrically connected to one electrode (a first electrode) of the electrode body. In addition, the battery can may be electrically connected to the other electrode (a second electrode) of the electrode body. The outer ring may be disposed along a peripheral edge of the terminal portion while the outer ring is insulated from the terminal portion. For example, the outer ring is made of metal and has a through hole. In this case, the terminal portion closes the through hole while the terminal portion is insulated from the outer ring. The insulation and the sealing between the terminal portion and the outer ring may be performed by the first gasket, or by another gasket, or may be performed by application of an insulating agent to a contact portion between the terminal portion and the outer ring, or by insulation processing to a surface of one of the terminal portion and the outer ring.

The first gasket is interposed between the opening edge portion and an external peripheral edge portion of the outer ring. The fixing member compresses the first gasket in a direction in which the external peripheral edge portion and the opening edge portion face each other via the external peripheral edge portion and the opening edge portion. As a result, the opening edge portion and the sealing member are sealed in close contact with each other.

The fixing member is made of, for example, metal, and may be electrically connected to the cylindrical portion of the battery can. Accordingly, the fixing member may be electrically connected to the second electrode of the electrode body. Therefore, the voltage of the external terminal connected to the battery can may be taken out from an upper side (terminal portion) of the battery.

In a battery in which a groove portion and a crimped portion are provided in a battery can, a terminal portion functions as an external terminal of one electrode (for example, a positive electrode) of the battery, and the battery can functions as an external terminal of the other electrode (for example, a negative electrode). However, on the battery can connected to the other electrode, the flatness of the crimped portion is low. Further, when a difference between an outer peripheral length and an inner peripheral length of the crimped portion increases, wrinkles are likely to occur in the crimped portion. Therefore, it is difficult to expand an area connectable to the external lead wire even if an extending distance of the crimped portion in the radial direction is increased. Therefore, it is difficult to pull out the other electrode from the upper side (terminal portion) of the battery. Therefore, when external lead wires are connected to the respective external terminals, one external lead wire is usually led out from an upper surface of the battery, and the other external lead wire is led out from a lower surface of the battery. In this case, a space for wiring is required in the upward and downward directions of the battery.

On the other hand, in the battery of the present exemplary embodiment, the fixing member may function as an external terminal of the other electrode connected to the battery can. Therefore, both electrodes can collect current from the upper side (terminal portion) of the battery. Thus, a space for wiring a lead connected to each external terminal (wiring space) may only exist on the upper side (terminal portion) of the battery, and the wiring space may be saved.

As the fixing member, a ring member processed to have flatness (for example, a second ring portion to be described later) may be used, unlike the crimped portion provided for the battery can in the middle of battery preparation. Therefore, by increasing a radial dimension of the ring member, the flatness of a top surface of the fixing member is suppressed from deteriorating even if the difference between the outer peripheral length and the inner peripheral length of the ring member increases. Thus, an area of a portion for connecting a lead may be easily expanded.

Alternatively, the fixing member and the outer ring may be electrically connected, and the external lead may be connected to an upper surface of the outer ring. In this case, it is not necessary to increase the size of the ring member of the fixing member, and the fixing member may be downsized.

The sealing between the terminal portion and the outer ring may be performed by interposing a second gasket between the terminal portion and the outer ring. The second gasket may be a gasket separate from the first gasket, or may be integrally formed with the first gasket. An inner surface of the outer ring facing the bottom portion between the terminal portion and the opening edge portion may be covered with the first gasket or the second gasket. When a part of the inner surface of the outer ring on facing the bottom portion has a region not covered with the first gasket and the second gasket, there are four possible paths connecting the inside and the outside of the battery can around the gasket: a path between the first gasket and the opening edge portion, a path between the first gasket and the outer ring, a path between the second gasket and the outer ring, and a path between the second gasket and the terminal portion. On the other hand, when the inner surface of the outer ring facing the bottom portion is covered with the first gasket or the second gasket, the number of paths connecting the inside and the outside of the battery can around the gasket is reduced to two paths: a path between the first gasket and the opening edge portion and a path between the second gasket and the terminal portion. Therefore, reliability in sealing of the battery is improved.

The outer ring and the gasket (the first gasket and/or the second gasket) may be joined to each other. For example, by integrally molding the outer ring and the gasket, an intermediate member in which the outer ring and the gasket are joined to each other is obtained, and by attaching the terminal portion to the intermediate member, the sealing member is formed. As a method of integral molding, insert molding may be used. In this case, the shapes of the outer ring and the gasket joined to the outer ring are not limited, and may be designed into any shapes. When the outer ring and the gasket are integrally molded, the outer ring and the gasket may be handled as one component. This reduces the number of components of the battery, and the battery may be easily manufactured.

The outer ring may not necessarily be a flat plate. For example, a step may be provided between the internal peripheral edge portion and the external peripheral edge portion, by providing an inclined portion or a bent portion between the internal peripheral edge portion (through hole side) and the external peripheral edge portion (opening edge portion side) of the outer ring. The outer ring may be inclined or bent such that the internal peripheral edge portion is positioned closer to the bottom portion (downward) than the external peripheral edge portion. As a result, the terminal portion may be disposed closer to the bottom portion, and the height of the battery may be easily reduced.

As one example of a method for sealing a space between the opening edge portion and the sealing member using the fixing member, a flange portion protruding outward in the radial direction of the cylindrical portion may be provided at the opening edge portion. In this case, the first gasket may be interposed between the external peripheral edge portion of the outer ring and the flange portion, and compressed by the fixing member. The flange portion of the opening edge portion does not need to protrude perpendicularly to an axis of the cylindrical portion. In addition, the direction in which the outer ring, the first gasket, and the flange portion overlap does not need to be parallel to the axis.

More specifically, for example, the fixing member may include: a side wall portion in a tubular shape extending in a direction in which the external peripheral edge portion and the opening edge portion face each other; a first ring portion extending inward in the radial direction from an inner peripheral surface of the side wall portion and being in contact with the flange portion; and a second ring portion located at a position closer to the outer ring than the first ring portion, the second ring portion extending inward in the radial direction from the inner peripheral surface of the side wall portion. In this case, a cross-sectional shape of the fixing member including the shaft of the cylindrical portion is a U-shape. For example, by setting a distance between the first ring portion and the second ring portion to be smaller than a dimension in a stacking direction of a stacked body of the outer ring, the first gasket in a non-compressed state, and the flange portion, and providing the external peripheral edge portion of the outer ring, the first gasket, and the flange portion between the first ring portion and the second ring portion, the first gasket may be compressed, and thus the space between the opening edge portion and the sealing member may be sealed by a repulsive force of the first gasket. In this case, the sealing of the space between the opening edge portion and the sealing member by the fixing member may be performed by press-fitting a battery having the sealing member placed on the opening edge portion into the fixing member.

A radial dimension of the second ring portion (or a second eaves portion of a fixing component to be described later) may be larger than a radial dimension of the first ring portion (or a first eaves portion of a fixing component to be described later). This makes it possible to expand an area of a joint surface of the fixing member with the external lead, while a dead space in the radial direction as a battery is suppressed.

The fixing member may be provided so as to surround at least a part of the battery can in a circumferential direction. Therefore, the fixing member does not need to have a complete cylindrical shape, and may be provided with the side wall portion extending in a C shape when viewed in the axial direction. Similarly to the side wall portion, the first ring portion and the second ring portion do not need to be have a complete annular shape.

Further, the method for sealing the space between the opening edge portion and the sealing member by the fixing member is not limited to the above example. The sealing may be performed by deforming the first ring portion and/or the second ring portion after the fixing member sandwiches the external peripheral edge portion of the outer ring, the first gasket, and the flange portion. At this time, the first ring portion (or the first eaves portion to be described later) may be deformed more preferentially than the second ring portion (or the second eaves portion to be described later). This makes it possible to press the outer ring, the first gasket, and the flange portion, while the flatness of the second ring portion is maintained. The preferential deformation of the first ring portion rather than the second ring portion means that the first ring portion has a larger angle with a straight line extending in the radial direction than the second ring portion, for example.

Further, the second ring portion (or the second eaves portion to be described later) may be thicker than the first ring portion (or the first eaves portion to be described later). In this case, the second ring portion is more rigid than the first ring portion, and the second ring portion is less likely to deform than the first ring portion. The first ring portion (or the first eaves portion to be described later) may be thinner than the side wall portion (or a base portion to be described later.). In this case, the first ring portion is easily deformed. Accordingly, when the sealing is performed by deforming the first ring portion and/or the second ring portion, deformation of the second ring portion is suppressed, and flatness of the second ring portion may be maintained.

At a distal end portion in the radial direction of the first ring portion (or the first eaves portion to be described later), the surface of the first ring portion facing the second ring portion may have a tapered surface, or the distal end portion may be bent, so that a distance to the second ring portion (or the second eaves portion to be described later) is larger on an inner side in the radial direction (terminal portion side) than on an outer side in the radial direction (side wall portion side). As a result, the outer ring, the gasket, and the flange portion may be easily inserted between the first ring portion and the second ring portion.

In addition, the first ring portion and the flange portion, and/or the second ring portion and the outer ring may be joined by welding. Examples of the welding include laser welding.

The fixing member may include a plurality of fixing components disposed along the circumferential direction. Each of the fixing components includes, for example: the base portion corresponding to the side wall portion; the first eaves portion corresponding to the first ring portion of the fixing member, extending inward in the radial direction from the base portion, and being in contact with the flange portion: and the second eaves portion corresponding to the second ring portion, and extending inward in the radial direction from the base portion. A cross-sectional shape of each of the fixing components including the axis of the cylindrical portion is a U-shape.

By sandwiching the external peripheral edge portion of the outer ring, the first gasket, and the flange portion between the first eaves portion and the second eaves portion, the space between the opening edge portion and the sealing member at a part in the circumferential direction is sealed. By arranging the plurality of fixing components adjacent to each other along an entire part of a circumference of the opening edge portion, an entire part of a circumference of the space between the opening edge portion and the sealing member may be sealed.

In a case where the fixing member includes a plurality of fixing components, adjacent fixing components may be provided at a predetermined interval. At this time, a gap between the fixing components adjacent to each other in the circumferential direction may be sealed by a method other than the method using the fixing member (for example, welding joining). In addition, in a case where the plurality of fixing components provide a predetermined or higher level of reliability for the sealing between the outer ring and the battery can, a separate process for sealing the gap is not necessary.

Further, as long as a certain or higher level of sealing reliability may be obtained, it is not necessary to seal the entire part of the circumference of the space between the opening edge portion and the sealing member. In addition, the base portion (or the side wall portion) may be provided outside the outer peripheral edge of the outer ring and the outer peripheral edge of the flange portion. Thus, the outer ring or the like may be sandwiched between the fixing components by bringing the fixing components closer to the outer ring. In this case, even if the outer ring, the first gasket, and the flange portion are out of predetermined positions and overlap each other, such deviation may be absorbed to perform sealing.

A tongue piece and/or a notch may be provided at an end in the circumferential direction of the first eaves portion and/or the second eaves portion extending inward in the radial direction. For example, the tongue piece may be provided at one end in the circumferential direction of the first eaves portion and/or the second eaves portion, and the notch may be provided at an end in the circumferential direction of another fixing component disposed adjacent. The tongue piece and the notch have shapes corresponding to each other, and a contour of a protruding portion of the tongue piece and a contour of a recessed portion of the notch are substantially the same. In this case, when the plurality of fixing components are arranged adjacent to each other, the tongue piece of one fixing portion is fitted into the notch of another fixing portion. Thus, the plurality of fixing components may be joined to each other to provide the fixing member in a tubular shape as a whole. As a result, it is possible to suppress a gap in the circumferential direction from being interposed between the adjacent fixing components, and to improve sealing property of the space between the opening edge portion and the sealing member. In addition, as compared with a case where a contour of the end in the circumferential direction of the first eaves portion and/or the second eaves portion is a straight line extending in one direction, in a case where the tongue piece or the notch is provided, a shape of boundary between the adjacent fixing components becomes complicated, and an entry path between the outer ring, the first gasket, and the flange portion pressed by the fixing component may be complicated. Therefore, airtightness as a battery is improved.

For example, the tongue piece may be provided at one end in the circumferential direction of the first eaves portion and/or the second eaves portion, and the notch may be provided at the other end in the circumferential direction. In this case, a plurality of fixing components having the same configuration may be joined to obtain the fixing member, and the number of components may be reduced.

Both of the tongue piece and the notch may be provided at one end in the circumferential direction of the first eaves portion and/or the second eaves portion. In this case, a notch corresponding to the tongue piece of the one end and a tongue piece corresponding to the notch of the one end are both provided at the other end in the circumferential direction of the first eaves portion and/or the second eaves portion of an adjacent solid member. Alternatively, the tongue piece and/or the notch may be provided at the end in the circumferential direction of the base.

In addition, the tongue piece portion and the notch portion that are to be fitted may have portions facing each other in a direction in which the flange portion and the outer ring face each other. In this case, in the facing direction, by the repulsive force of the compressed gasket applied to the facing portions, the gap between the tongue piece portion and the notch portion fitted together is easily reduced, and thus the airtightness is improved. Examples of the configuration in which the flange portion and the outer ring have the portions that face each other in the facing direction include: a configuration in which end surfaces of the tongue piece portion and the notch portion fitted together are each inclined from a direction perpendicular to the facing direction; and a configuration in which there is a step portion in a thickness of the first eaves portion and/or the second eaves portion.

A side of the opening edge portion of the cylindrical portion may be reduced in diameter. That is, an outer diameter of the cylindrical portion at the opening edge portion may be smaller than an outer diameter of the cylindrical portion excluding the opening edge portion. An inner diameter of the side wall portion of the fixing member may be equal to or less than a maximum value of the outer diameter of the cylindrical portion. As a result, an outer diameter of the side wall portion of the fixing member is substantially equal to or smaller than the outer diameter on the side of the bottom portion of the cylindrical portion, and thus changes in the diameter of the battery in the axial direction may be reduced. Note that, unlike the conventional annular groove, the reduced diameter portion in this case is not used for sealing the terminal portion, and thus an inner diameter of the reduced diameter portion may be larger than that of the conventional annular groove.

Hereinafter, a battery according to an exemplary embodiment of the present invention will be specifically described with reference to the drawings, but the present invention is not limited to this exemplary embodiment.

Figure 2:
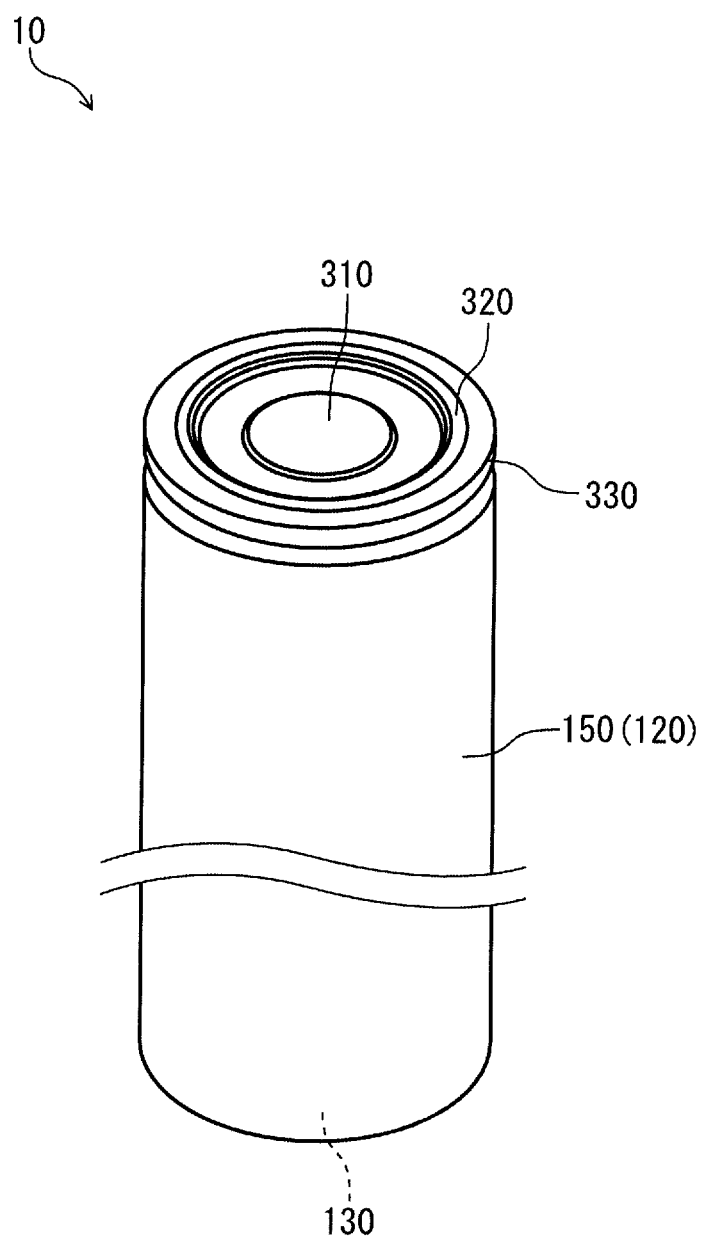
FIG. 2 is a perspective view showing an appearance of the battery.
Figure 3:
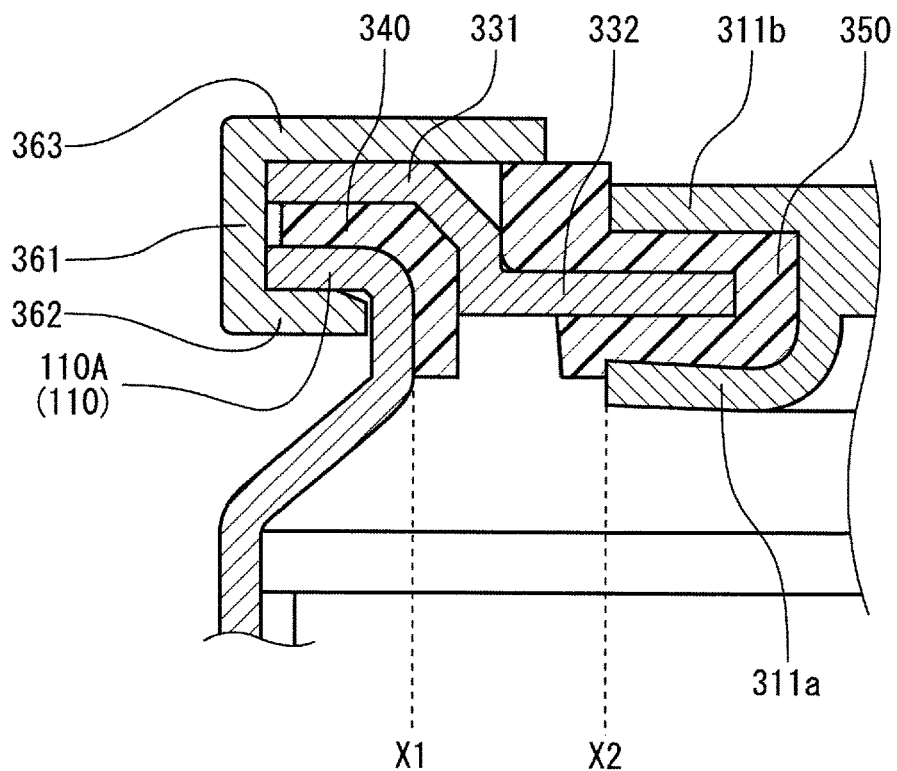
FIG. 3 is an enlarged schematic longitudinal sectional view of a main part of the battery shown in FIG. 1.

FIG. 1 is a schematic longitudinal sectional view of battery 10 according to the present exemplary embodiment. FIG. 2 is a perspective view of the battery. FIG. 3 is a schematic cross-sectional view enlarging near opening edge portion 110 in FIG. 1. In FIGS. 1 to 3, a state of a cylindrical portion of the battery, particularly, a state near opening edge portion 110 is emphasized. In addition, a dimensional ratio among elements of components such as terminal portion 310, gasket 320 (340, 350), outer ring 330, and fixing member 360 may not be the same as an actual dimensional ratio. The same applies to the drawings that follow.

Battery 10 is a cylindrical type, and includes cylindrical and bottomed battery can 100, cylindrical electrode body 200 housed in the battery can, and sealing member 300 for sealing an opening of battery can 100. Battery can 100 includes cylindrical portion 120 that houses electrode body 200, and bottom portion 130. Cylindrical portion 120 has opening edge portion 110 at one end portion of the cylindrical portion, and the other end portion of the cylindrical portion is closed by bottom portion 130. Cylindrical portion 120 includes opening edge portion 110, and housing portion 150 that houses the electrode body. An opening of opening edge portion 110 is closed by sealing member 300.

Sealing member 300 includes terminal portion 310, gasket 320, and outer ring 330. Outer ring 330 is in a plate shape having a through hole extending in the thickness, and includes external peripheral edge portion 331 and internal peripheral edge portion 332.

Terminal portion 310 is in a disk shape, for example, and has an explosion-proof function. Specifically, terminal portion 310 includes thick peripheral portion 311 and thick central region 312 for securing structural strength, as well as thin portion 313 exhibiting an explosion-proof function. Thin portion 313 is provided in a region between thick peripheral portion 311 and thick central region 312. An end portion of lead wire 210 led out from a positive electrode or a negative electrode constituting electrode body 200 is connected to an inner surface of thick central region 312. Thus, terminal portion 310 has one terminal function. The outer surfaces of thick peripheral portion 311, thick central region 312, and thin portion 313 are substantially flush.

Thick peripheral portion 311 has inner peripheral edge portion 311a disposed on a side of bottom portion 130 (inner side) and outer peripheral edge portion 311b having an outer surface and disposed on a side opposite to bottom portion 130 (outer side).

In the example of FIG. 1, thin portion 313 is provided such that a thickness of thin portion 313 becomes thinner toward thick peripheral portion 311 from thick central region 312, and thinnest at a boundary portion with thick peripheral portion 311. Therefore, when an internal pressure of battery can 100 increases, terminal portion 310 swells outward, a stress due to tension concentrates on the boundary portion between thick peripheral portion 311 and thin portion 313, and breakage occurs from the boundary portion. As a result, the internal pressure of battery can 100 is released, and safety of battery 10 is ensured.

Gasket 320 seals between opening edge portion 110 and terminal portion 310. Gasket 320 includes, for example, first gasket 340 and second gasket 350 that are disposed apart from each other. First gasket 340 seals between opening edge portion 110 and the outer ring. Second gasket 350 seals between terminal portion 310 and outer ring 330. Second gasket 350 includes an external ring portion covering an upper side of internal peripheral edge portion 332 of outer ring 330, an internal ring portion covering a lower side of internal peripheral edge portion 332 of outer ring 330, and a junction ring portion connecting the external ring portion and the internal ring portion. For example, the external ring portion, the internal ring portion, and the junction ring portion are an integrally molded body. Note that an explosion-proof function is not essential to achieve the effects of the present invention.

Outer ring 330 has a through hole. The through hole is closed by terminal portion 310. Inner peripheral edge portion 311a and outer peripheral edge portion 311b of terminal portion 310 axially sandwich second gasket 350 covering internal peripheral edge portion 332 of outer ring 330. As a result, insulation and sealing between terminal portion 310 and outer ring 330 are provided via second gasket 350.

First gasket 340 is interposed between external peripheral edge portion 331 of outer ring 330 and flange portion 110A that is formed on opening edge portion 110 and protruding outward in the radial direction. First gasket 340 is compressed by fixing member 360 via external peripheral edge portion 331 and flange portion 110A. Accordingly, a space between opening edge portion 110 and outer ring 330 is sealed via first gasket 340.

Outer ring 330 may be mutually joined with first gasket 340 and/or second gasket 350. For example, by integrally molding outer ring 330 with first gasket 340 and/or second gasket 350, a sealing member in which outer ring 330 is joined to first gasket 340 and/or second gasket 350 is obtained. As a method of integral molding, insert molding may be used. In this case, the shapes of outer ring 330, first gasket 340, and second gasket 350 are not limited, and may be designed into any shapes. In addition, outer ring 330 and first gasket 340 and/or second gasket 350 may be handled as one component, and manufacturing of the battery may be facilitated.

Fixing member 360 includes, for example, side wall portion 361, first ring portion 362, and second ring portion 363. Side wall portion 361 has a tubular shape, and extends in a direction in which external peripheral edge portion 331 of outer ring 330 and opening edge portion 110 face each other. First ring portion 362 extends inward in the radial direction from an inner peripheral surface of side wall portion 361, and is in contact with flange portion 110A. Second ring portion 363 extends inward in the radial direction from the inner peripheral surface of side wall portion 361 close to outer ring 330 with respect to first ring portion 362. First ring portion 362 and second ring portion 363 sandwich external peripheral edge portion 331 of outer ring 330, first gasket 340, and flange portion 110A, in a state where first gasket 340 is compressed.

Outer ring 330 is bent between external peripheral edge portion 331 and internal peripheral edge portion 332, and internal peripheral edge portion 332 is positioned closer to bottom portion 130 than external peripheral edge portion 331 is. As a result, as illustrated in FIG. 1, an outer surface of terminal portion 310 connected to the external terminal may be positioned lower than an outer surface of second ring portion 363 of fixing member 360.

In the example of FIG. 1, outer ring 330 is electrically connected to second ring portion 363 of fixing member 360 at external peripheral edge portion 331. However, first gasket 340 or second gasket 350 may be interposed between second ring portion 363 and external peripheral edge portion 331.

Fixing member 360 is conductive, and has the same polarity as that of battery can 100. Thus, fixing member 360 can have the other terminal function having a polarity different from that of terminal portion 310. Therefore, both electrodes of battery 10 may collect current from an upper surface of sealing member 300. For example, a first external lead wire may be connected to second ring portion 363 of fixing member 360, and a second external lead wire may be connected to the outer surface of thick central region 312 of terminal portion 310.

Opening edge portion 110 may be reduced in diameter with respect to housing portion 150. As a result, an amount of protrusion of an outer diameter of side wall portion 361 of fixing member 360 with respect to an outer diameter of housing portion 150 may be suppressed. The change in the diameter of the battery in the axial direction may be reduced by setting an inner diameter of side wall portion 361 to be substantially equal to or smaller than the outer diameter of housing portion 150. In the present exemplary embodiment, although the diameter of non-accommodating portion 160 is reduced, the decrease in the arrangement space of the electrode body due to the reduction of the diameter is suppressed, as compared with the conventional configuration in which the reduced diameter portion is formed by grooving. Thus, a battery having a high energy density can be realized.

Figure 4:
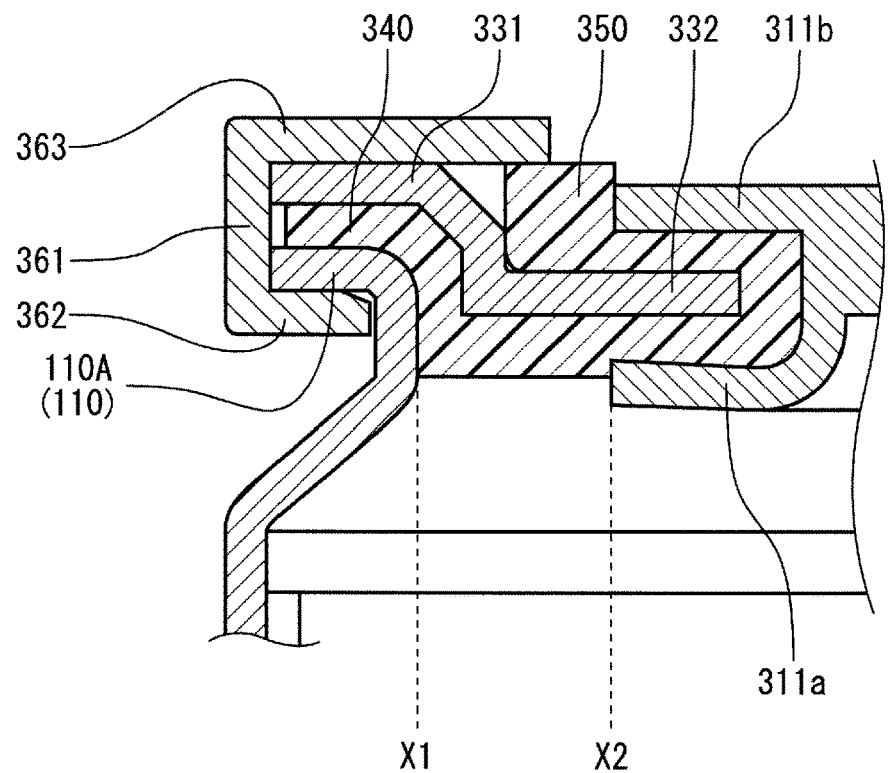
FIG. 4 is an enlarged schematic longitudinal sectional view of a main part illustrating a modification of the battery shown in FIG. 1.

FIG. 4 shows a modification of battery 10. FIG. 4 is a schematic longitudinal sectional view enlarging near opening edge portion 110 of battery 11 according to the present exemplary embodiment. In battery 11, first gasket 340 and second gasket 350 are integrally formed to provide one gasket 320 as a whole. Gasket 320 entirely covers an inner surface on a bottom side of outer ring 330 between innermost peripheral position X1 of opening edge portion 110 and on an outermost peripheral side position (end of inner peripheral edge portion 311a) X2 of terminal portion 310. As a result, gas or electrolyte solution may come into contact with gasket 320, but may not come into direct contact with outer ring 330. Gaps through which an inside and an outside of the battery can communicate are provided only between terminal portion 310 and gasket 320, and between opening edge portion 110 and gasket 320. This prevents gas and/or moisture from flowing in and out along the outer ring. Thus, the airtightness of the battery is improved.

In FIGS. 3 and 4, second ring portion 363 extends inward in the radial direction (along an inner circumference) of the cylindrical portion to a position covering an upper surface of second gasket 350, and covers a top surface of outer ring 330 (upper surface of external peripheral edge portion 331). However, second ring portion 363 and second gasket 350 may be separated from each other in the radial direction, and the top surface of outer ring 330 may be exposed at an upper surface of battery 10.

Figure 5:
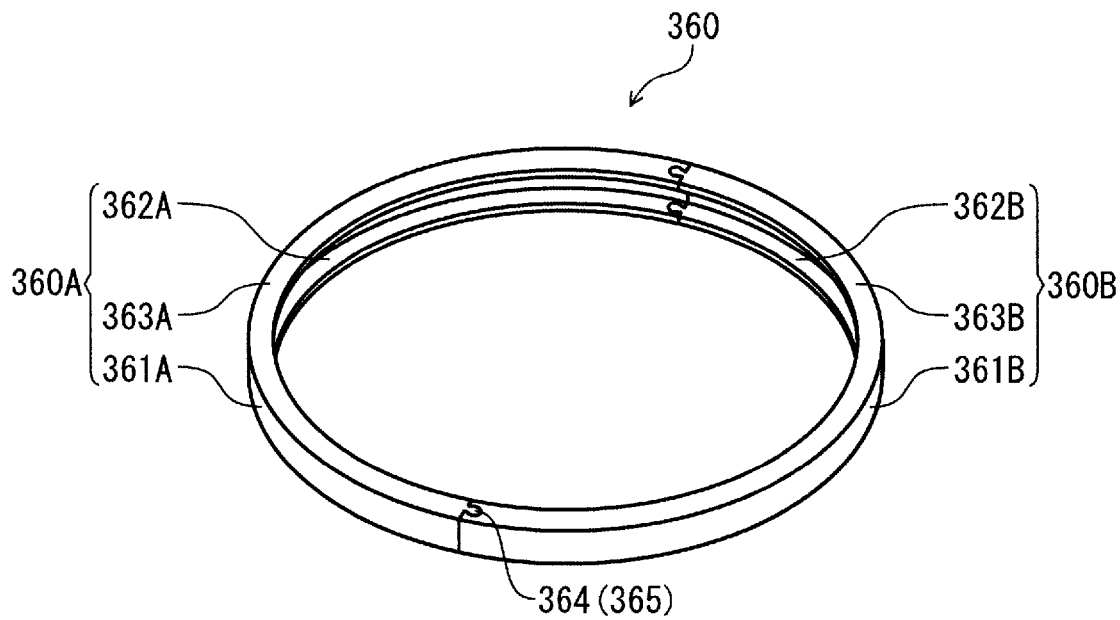
FIG. 5 is a perspective view illustrating an example of a fixing member including a plurality of fixing components.
Figure 5:
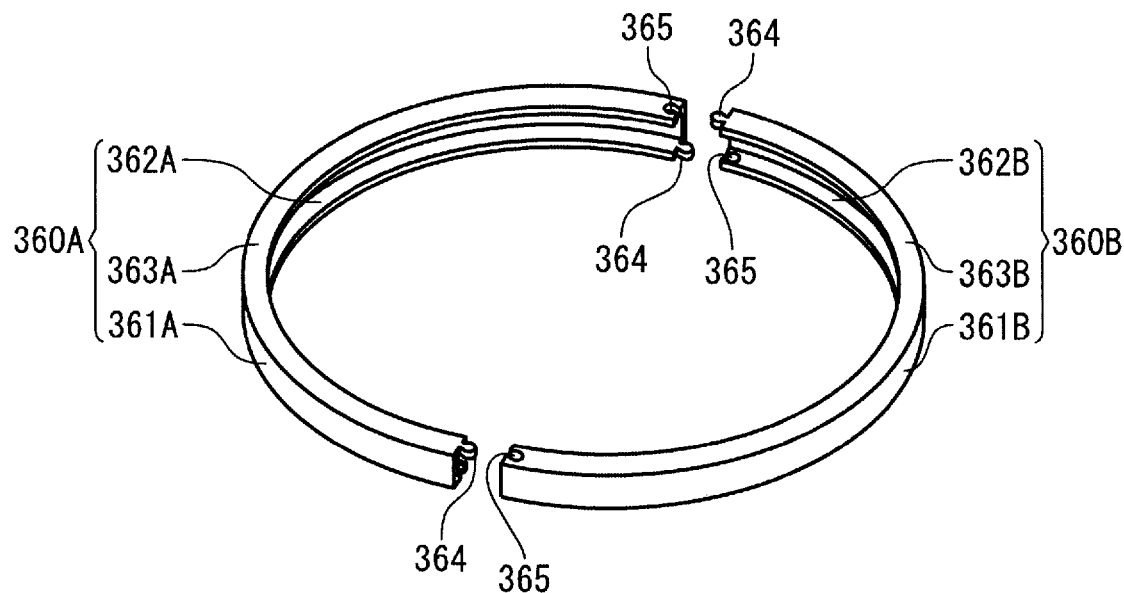

FIG. 5 illustrates an example in which fixing member 360 includes a plurality of fixing components. In the example of FIG. 5, fixing member 360 includes two fixing components 360A and 360B. FIG. 5(A) is a perspective view illustrating a state in which fixing components 360A and 360B are joined to provide fixing member 360. FIG. 5(B) is a perspective view illustrating a state before fixing member 360 is formed, in which fixing components 360A and 360B are separated.

Each of fixing components 360A and 360B is a semicircular portion of fixing member 360 having a ring shape.

Fixing component 360A includes base portion 361A corresponding to side wall portion 361 of fixing member 360, first eaves portion 362A corresponding to first ring portion 362 of fixing member 360, and second eaves portion 363A corresponding to second ring portion 363 of fixing member 360. Fixing component 360B includes base portion 361B corresponding to side wall portion 361 of fixing member 360, first eaves portion 362B corresponding to first ring portion 362 of fixing member 360, and second eaves portion 363B corresponding to second ring portion 363 of fixing member 360. In the circumferential direction, tongue piece 364 is provided at one end and notch 365 is provided at the other end of each of first eaves portions 362A and 362B. Similarly, in the circumferential direction, notch 365 is provided at one end and tongue piece 364 is provided at the other end of each of second eaves portions 363A and 363B. Tongue piece 364 and notch 365 have contours corresponding to each other. Tongue piece 364 of first eaves portion 362A is fitted with notch 365 of first eaves portion 362B, and tongue piece 364 of first eaves portion 362B is fitted with notch 365 of first eaves portion 362A, and thus fixing components 360A and 360B are joined to provide fixing member 360. At this time, tongue piece 364 of second eaves portion 363A is also fitted with notch 365 of second eaves portion 363B, and tongue piece 364 of second eaves portion 363B is also fitted with notch 365 of second eaves portion 363A.

Figure 6:
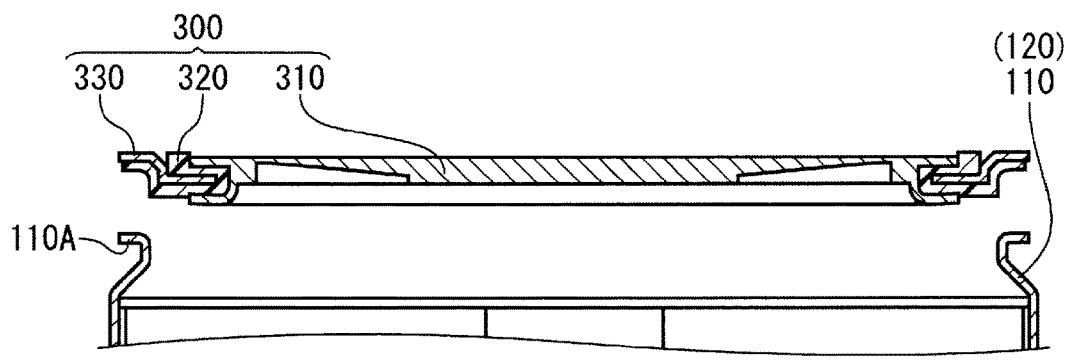
FIG. 6 is a process cross-sectional view showing a manufacturing process of the battery shown in FIG. 1.
Figure 6:
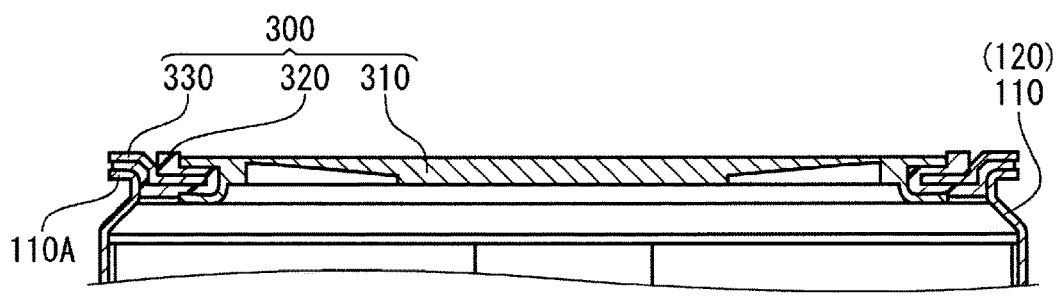
Figure 6:
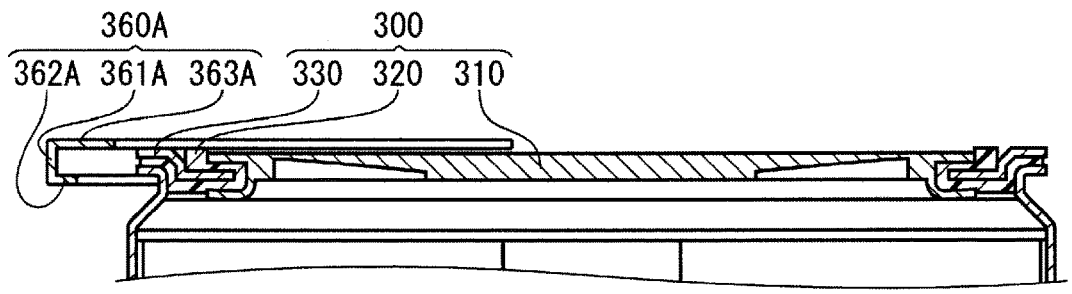
Figure 6:
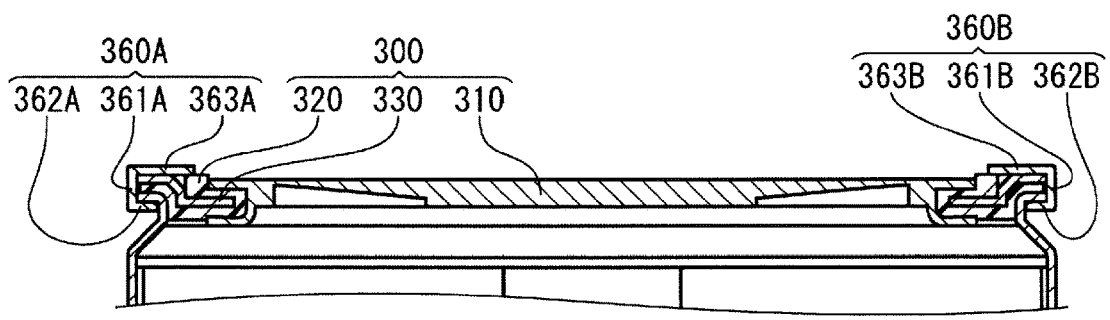

FIG. 6 shows an example of a method for manufacturing battery 10 according to the present exemplary embodiment. FIG. 6(A) to 6(D) show cross-sectional views of processing steps of battery 10.

First, as shown in FIG. 6(A), sealing member 300 in which gasket 320 and outer ring 330 are attached to terminal portion 310 is placed on opening edge portion 110 so that the external peripheral edge portion (internal ring portion) of gasket 320 overlaps flange portion 110A. A state after the placement is illustrated in FIG. 6(B).

Next, as shown in FIG. 6(C), outer ring 330, gasket 320, and opening edge portion 110 are fitted with fixing component 360A in the radial direction of the battery. Similarly, outer ring 330, gasket 320, and opening edge portion 110 are fitted with fixing component 360B from an opposite to fixing component 360A in the radial direction. As a result, the battery shown in FIG. 6(D) is obtained.

A material of battery can 100 is not particularly limited, and examples of the material include iron and/or an iron alloy (including stainless steel), copper, aluminum, and an aluminum alloy (alloys containing a small amount of other metals such as manganese, copper, and the like). Materials of terminal portion 310, outer ring 330, and fixing member 360 are also not particularly limited, and examples of the material include the same materials as that of battery can 100.

While a material of gasket 320 (first gasket 340 and second gasket 350) is not limited, polypropylene (PP), polyphenylene sulfide (PPS), polyethylene (PE), polybutylene terephthalate (PBT), perfluoroalkoxy alkane (PFA), polytetrafluoroethylene (PTFE), polyamide (PA), or the like may be used, for example, as a material that can be easily integrally molded.

Next, a configuration of electrode body 200 will be exemplarily described taking a lithium ion secondary battery as an example.

Cylindrical electrode body 200 is a wound type, and is configured by spirally winding a positive electrode and a negative electrode with a separator interposed between the positive electrode and the negative electrode. Internal lead wire 210 is connected to one of the positive electrode and the negative electrode. Internal lead wire 210 is connected to an inner surface of thick central region 312 of terminal portion 310 by welding or the like. Another lead wire is connected to the other of the positive electrode and the negative electrode, and the other lead wire is connected to an inner surface of battery can 100 by welding or the like. Another insulating plate (lower insulating plate) may be provided between bottom portion 130 of battery can 100 and electrode body 200. In this case, the other lead may extend so as to bypass the other insulating plate or extend so as to be inserted into a through hole formed in the other insulating plate.

(Negative Electrode)

The negative electrode includes a belt-shaped negative current collector and negative active material layers provided on both surfaces of the negative current collector. As the negative current collector, a metal film, a metal foil, or the like may be used. Preferably, a material of the negative current collector is at least one selected from the group consisting of copper, nickel, titanium, alloys thereof, and stainless steel. It is preferable that a thickness of the negative current collector be 5 µm to 30 µm, for example.

The negative active material layers contain a negative active material, and contain a binder and a conductive agent as necessary. The negative active material layers may be a deposited film formed by a gas phase method (for example, vapor deposition). Examples of the negative active material include Li metal, a metal or an alloy electrochemically reacting with Li, a carbon material (for example, graphite), a silicon alloy, a silicon oxide, and a metal oxide (for example, lithium titanate). A thickness of the negative active material layers is preferably 1 µm to 300 µm, for example.

(Positive Electrode)

The positive electrode includes a belt-shaped positive current collector and positive active material layers provided on both surfaces of the positive current collector. As the positive current collector, a metal film, a metal foil (stainless steel foil, aluminum foil, or aluminum alloy foil), or the like is used.

The positive active material layers contain a positive active material and a binder, and contains a conductive agent as necessary. The positive active material is not particularly limited, but a lithium-containing composite oxide such as $LiCoO_2$ or $LiNiO_2$ may be used. A thickness of the positive active material layers is preferably 1 µm to 300 µm, for example.

As the conductive agent contained in the active material layers, graphite, carbon black, or the like is used. An amount of the conductive agent is 0 parts by mass to 20 parts by mass relative to 100 parts by mass of the active material, for example. As the binder contained in the active material layers, a fluororesin, an acrylic resin, rubber particles, or the like is used. An amount of the binder is 0.5 parts by mass to 15 parts by mass relative to 100 parts by mass of the active material, for example.

(Separator)

As the separator, a resin microporous membrane or a nonwoven fabric is preferably used. A material (resin) of the separator is preferably polyolefin, polyamide, polyamideimide, or the like. A thickness of the separator is 8 µm to 30 µm, for example.

(Electrolyte)

As an electrolyte, a nonaqueous solvent in which a lithium salt is dissolved may be used. Examples of the lithium salt include $LiClO_4$, $LiBF_4$, $LiPF_6$, $LiCF_3SO_3$, $LiCF_3CO_2$, and imide salts. Examples of the nonaqueous solvent include: cyclic carbonate esters such as propylene carbonate, ethylene carbonate, and butylene carbonate; chain carbonate esters such as diethyl carbonate, ethyl methyl carbonate, and dimethyl carbonate; and cyclic carboxylate esters such as γ-butyrolactone and γ-valerolactone.

Although the lithium ion secondary battery has been described above as an example, the present invention may be used in a battery in which a battery can is sealed using a sealing member, regardless of whether the battery is a primary battery or a secondary battery.

INDUSTRIAL APPLICABILITY

The battery according to the present invention may be used for batteries with various types of cans, and is suitable for uses such as power sources for mobile devices, hybrid vehicles, electric vehicles, and the like.

REFERENCE MARKS IN THE DRAWINGS

- 100: battery can
- 120: cylindrical portion
- 110: opening edge portion
- 110A: flange portion
- 150: housing portion
- 130: bottom portion
- 200: electrode body
- 210: internal lead wire
- 300: sealing member
- 310: terminal portion
- 311a: inner peripheral edge portion
- 311b: outer peripheral edge portion
- 312: central region
- 313: thin portion
- 320: gasket
- 340: first gasket
- 350: second gasket
- 330: outer ring
- 331: external peripheral edge portion
- 332: internal peripheral edge portion
- 360: fixing member
- 360A,360B: fixing component
- 361A,361B: base portion
- 362A,362B: first eaves portion
- 363A,363B: second eaves portion
- 364: tongue piece
- 365: notch
- 361: side wall portion
- 362: first ring portion
- 363: second ring portion

The invention claimed is:

1. A battery comprising:
a battery can including a cylindrical portion and a bottom portion, the cylindrical portion including an opening edge portion at one end portion of the cylindrical portion, the bottom portion closing the other end portion of the cylindrical portion;
an electrode body housed in the cylindrical portion;
a sealing member sealing an opening of the opening edge portion; and
a fixing member fixing the sealing member to the battery can,
wherein the sealing member includes a terminal portion, an outer ring, and a first gasket, the outer ring being disposed along a peripheral edge of the terminal portion in a state of insulation from the terminal portion, and the first gasket being interposed between the opening edge portion and an external peripheral edge portion of the outer ring,
the electrode body includes a first electrode and a second electrode,
the terminal portion is electrically connected to the first electrode,
the battery can is electrically connected to the second electrode, and
the fixing member compresses the first gasket in a direction in which the external peripheral edge portion and the opening edge portion face each other, the fixing member compressing the first gasket via the external peripheral edge portion and the opening edge portion.

2. The battery according to claim 1, further comprising:
a second gasket interposed between the terminal portion and the outer ring, the second gasket sealing between the terminal portion and the outer ring.

3. The battery according to claim 2, wherein
the first gasket and the second gasket are integrated.

4. The battery according to claim 2, wherein
the outer ring includes an inner surface covered with at least one of the first gasket and the second gasket, the inner surface facing the bottom portion and between the terminal portion and the opening edge portion.

5. The battery according to claim 2, wherein
the outer ring and at least one of the first gasket and the second gasket are joined to each other.

6. The battery according to claim 1, wherein
the opening edge portion includes a flange portion protruding outward in a radial direction of the cylindrical portion, and
the first gasket is interposed between the external peripheral edge portion of the outer ring and the flange portion.

7. The battery according to claim 6, wherein
the fixing member includes:
a side wall portion extending in a direction in which the external peripheral edge portion and the opening edge portion face each other;
a first ring portion extending inward in the radial direction from an inner peripheral surface of the side wall portion and being in contact with the flange portion; and
a second ring portion located at a position closer to the outer ring than the first ring portion, the second ring portion extending inward in the radial direction from the inner peripheral surface of the side wall portion, and
the external peripheral edge portion of the outer ring, the first gasket, and the flange portion are sandwiched between the first ring portion and the second ring portion.

8. The battery according to claim 7, wherein
the fixing member includes a plurality of fixing components arranged along a circumferential direction, and
each of the fixing components includes:
a base portion corresponding to the side wall portion;
a first eaves portion corresponding to the first ring portion, extending inward in the radial direction from the base portion, and being in contact with the flange portion; and
a second eaves portion corresponding to the second ring portion and extending inward in the radial direction from the base portion.

9. The battery according to claim 8, further comprising:
a tongue piece at one circumferential end of at least one of the first eaves portion and the second eaves portion extending inward in the radial direction, wherein the tongue piece is fitted with a notch provided in another of the fixing components adjacent in the circumferential direction.

10. The battery according to claim 8, wherein
the second eaves portion is thicker than the first eaves portion.

11. The battery according to claim 1, wherein
the outer ring is in a plate shape including a through hole extending in a thickness direction,
the terminal portion closes the through hole, and
the outer ring includes an internal peripheral edge portion close to the through hole, the internal peripheral edge portion being positioned closer to the bottom portion than to the external peripheral edge portion.

12. The battery according to claim 7, wherein
a diameter of the cylindrical portion is reduced near the opening edge portion, and
an inner diameter of the side wall portion of the fixing member is equal to or smaller than a maximum value of an outer diameter of the cylindrical portion.

13. The battery according to claim 1, wherein
the fixing member is electrically connected to the cylindrical portion.

14. The battery according to claim 13, wherein
the fixing member is electrically connected to the outer ring.

* * * * *